United States Patent [19]
Plasek

[11] Patent Number: 5,459,314
[45] Date of Patent: Oct. 17, 1995

[54] METHOD FOR CORRECTING DENSITY MEASUREMENTS THAT ARE AFFECTED BY NATURAL AND NEUTRON-INDUCED GAMMA RADIATION

[75] Inventor: Ronald E. Plasek, Houston, Tex.

[73] Assignee: Schlumberger Technology Corporation, Houston, Tex.

[21] Appl. No.: 105,258

[22] Filed: Aug. 12, 1993

[51] Int. Cl.⁶ .................................................. G01V 5/12
[52] U.S. Cl. ...................... 250/269.7; 250/264; 250/266; 250/269.3
[58] Field of Search ................................. 250/269, 264, 250/265, 266

[56] References Cited

U.S. PATENT DOCUMENTS

| | | |
|---|---|---|
| 3,240,938 | 3/1966 | Hall . |
| 3,801,816 | 4/1974 | Arnold ..................................... 250/370 |
| 4,034,218 | 7/1977 | Turcotte .................................. 250/269 |
| 4,152,596 | 5/1979 | Marshall, III ......................... 250/458.1 |
| 4,180,727 | 12/1979 | Givens .................................... 250/269 |
| 4,297,575 | 10/1981 | Smith, Jr. et al. ....................... 250/265 |
| 4,524,273 | 6/1985 | Hubner .................................... 250/269 |
| 4,529,877 | 7/1985 | Arnold .................................... 250/266 |

Primary Examiner—Carolyn E. Fields
Attorney, Agent, or Firm—Henry N. Garrana; Darcell Walker

[57] ABSTRACT

A method for measuring formation density corrected for activated gamma radiation. The formation adjacent the borehole is irradiated with low energy gamma radiation from a density tool source. At least one gamma ray detection means is spaced longitudinally from the source. A gamma ray spectrum containing gamma rays that result from density source radiation and also activated gamma rays is detected by the detection means. The activated gamma rays are identified and subtracted from the total number of detected gamma rays which results in the gamma ray count from the density tool source. This gamma ray count can then be used in conventional density calculation processes to determine formation density that has been corrected for activated gamma rays caused by naturally occurring gamma radiation and from other logging equipment that induces gamma radiation.

15 Claims, 5 Drawing Sheets

METHOD FOR CORRECTING DENSITY MEASUREMENTS THAT ARE AFFECTED BY NATURAL AND NEUTRON-INDUCED GAMMA RADIATION

FIELD OF THE INVENTION

This invention relates to a method for measuring the density of a subsurface earth formation and in particular, it relates to a method that measures the density of an earth formation and corrects the density measurements that are affected by high energy gamma rays generated from natural sources and non-density tool sources and detected during the formation density measurement process.

BACKGROUND OF THE INVENTION

In earth formation well logging, it is often necessary to use nuclear logging techniques to measure earth formation characteristics. In one form of well logging, the borehole and earth formation are irradiated with neutrons from a chemical or accelerator source, and the populations of neutrons and/or gamma rays, that are generated in the formation, are detected at one or more locations some distance or distances from the source. The detected neutrons and/or gamma ray are counted and the counts are correlatable to several earth formation characteristics.

One such correlatable earth formation characteristic is formation density. These formation density measurements are recorded on density logs and have several benefits. The primary use for density measurements is to identify porosity. However, other uses for density measurements include identification of minerals in evaporate deposits, detection of natural gases, determination of hydrocarbon density, and calculation of overburden pressure and rock mechanical properties.

In formation density logging, a radioactive gamma ray source is displaced in a borehole and emits low-energy gamma rays of approximately 0.66 Mev into the formation. Gamma rays may be thought of as high-velocity particles that collide with the electrons in the formation. At each collision, a gamma ray loses some, but not all, of its energy to the electron, and then continues movement with diminished energy. This type of interaction is known as "Compton scattering". The scattered gamma rays reaching the detector, at a fixed distance from the source, are counted as an indication of electron density or formation density. The number of Compton-scattering (gamma ray) collisions is related directly to the number of electrons in the formation. A fewer number of collisions imply fewer electrons, which usually means a higher electron density. Consequently, the response of the density tool is determined essentially by the electron density (number of electrons per cubic centimeter) of the formation. Electron density is related to the true bulk density, which in turn depends on the density of the rock matrix material, the formation porosity, and the density of the fluids filling the formation pores. In earth formation well logging, formation density logging tools along with several additional logging tools are usually run in combination, forming a "tool string". This tool string permits several different measurements to be made in the same borehole simultaneously with a corresponding minimization of rig-time, cost and risk to the well and logging tools. Normally, the formation density tool is the "bottom" tool in the string and the logging direction of the tool string is upward.

The density tool is usually a nuclear-type logging tool that emits gamma rays into the earth formation. However, some of the other tools in the tool string may also be nuclear-type logging tools containing their own gamma-ray or neutron logging source(s) that also emit gamma rays into the formation. Therefore, unless care is taken, it is possible that one of these other nuclear logging tools, especially located adjacent the formation density tool, may irradiate the formation with gamma rays in such a way that the formation density measurements are affected when the density tool later traverses (passes) the same depths as the "last" (bottom) tool.

For typical logging tool strings, the sources and detectors of a given tool are located at a sufficiently far away distance from the other tools that there are no directly-received (detected)events(gamma ray) arising from other sources in the tool string. However, if one of the logging sources happens to be a high output, high energy neutron source, such as an electronic deuterium-tritium 14 MeV "accelerator" source, then it is possible that one of the other logging tools in the tool string will receive additional gamma-ray events indirectly from the high output source.

The additional gamma rays will be due to neutron-induced activation of elements in the formation and borehole environments. Activation is the process by which a normally stable (non-radioactive formation element) nucleus becomes radioactive, when bombarded with another nuclear particle (usually a neutron). Once activated this nucleus emits gamma rays which can be detected. This activation can have radioactive decay times (half-lives) on the order of several seconds to several minutes and thus can still be present in appreciable amounts when other tools in the logging string pass the same location in a borehole a few seconds to a few minutes later. Therefore, any significant neutron-induced activation activity would be seen as additional events by any gamma-ray-detecting logging tools and in particular the formation density logging tool which normally follows an accelerator-based tool in the tool string. Therefore, unless the additional gamma ray count-rate due to activation is somehow compensated for, it would distort the formation density measurement, causing it to read a higher-than-actual count-rate, and thus a lower-than-actual formation density.

In neutron activation, different elements such as silicon and oxygen can generate gamma-rays, when bombarded with neutrons, that have higher energy levels than their activation thresholds. Similarly, other elements, such as aluminum, may also be activated by absorbing a neutron once the neutron has slowed down (reduced energies to thermal level). For example, the emitted gamma-rays from the activated silicon and oxygen which start out at energies of 1.78 MeV and 6.13 MeV, respectively, are scattered to lower energies in the formation and borehole regions. In the case of silicon and oxygen, both elements have significant activation cross-sections as well as relatively long-lived activated states (2.2 minute and 7.1 second half-lives respectively). After scattering in the formation and borehole, the activation oxygen and silicon gamma-rays appear as low energy gamma rays and can be detected by the density tool and thereby effecting the gamma ray flux in the energy band used to determine the formation density measurement. For this reason, it is necessary to correct the count of gamma rays detected in order to provide accurate density measurements.

Historically, multiple simultaneous logging measurements did not present the activation problems occurring today. The previous neutron tools which have been used to irradiate the earth formations have contained "chemical" steady-state sources or fission type sources. Chemical sources did not create the present day problems primarily because of two factors: 1) Only a small percentage of the "chemical" neutrons have energies sufficient to activate any element commonly encountered while logging, and 2) the thermal flux (~1×10$^7$ to ~1×10$^8$) is not high enough to activate appreciably any elements commonly encountered while logging. Therefore, virtually no distortions in the density tool count-rates, and hence density, have been historically observed when a neutron tool proceeds a density tool in the logging string.

However, many present generation tools contain non-chemical (accelerator) neutron sources having not only higher outputs but also having much higher neutron energies. In particular, these tools may contain accelerators of the type which generate monoenergetic 14 Mev neutrons. All of these neutrons, when generated, are above the activation energy thresholds for commonly occurring formation and borehole elements such as silicon, oxygen, aluminum, barium and other elements. Therefore, these activated elements can produce low energy gamma rays that are detected by the density tool. In addition, the higher total neutron output further excites elements activated by thermal neutron absorption (thermal activation). The half-lives of these elements can also be on the order of seconds to minutes. Therefore, as stated earlier, if not somehow compensated for, the density tool counting rate will be increased by these neutron-induced activities, resulting in erroneously low density readings.

There have been attempts to compensate for factors that affect formation bulk density. In one solution, U.S. Pat. No. 4,297,575 (Smith, Jr. et al), a logging instrument contains a gamma ray source and two gamma ray detectors. Measurements of the count-rate at each of the gamma ray detectors are made while passing a logging instrument through a well borehole. By appropriately combining the count-rates of the gamma rays of each detector by a predetermined relationship, measurements may be made of the earth formation compensated bulk density in the vicinity of the gamma ray source and detectors. Simultaneous graphical plots or well logs of the formation bulk density and other parameters of interest are recorded as a function of borehole depth.

A second solution corrects density logs that are affected by naturally occurring gamma rays and is related to the Smith et al, is U.S. Pat. No. 4,529,877 (Arnold). This patent provides a corrected density log having a correction for the adverse effects of gamma radiation from thorium, uranium and potassium ore bodies. The formation is irradiated with gamma-rays having an energy level of 0.663 Mev. A short spaced detector and a long spaced detector are used to detect gamma rays from the formation. A gamma ray spectrum is observed at one of the detectors and is broken down into four energy windows across the spectrum and count-rate signals are determined and corrected to separate naturally occurring gamma rays. This information may then be combined with count-rate information from the other detector, thereby yielding a compensated density log corrected from naturally occurring gamma rays.

Although these methods address density logging, several limitations are encountered when using these methods. Neither patent addresses the current problem of the effect on density measurements of detected gamma rays generated by non-density tool logging sources. Smith does not actually describe a method for correcting density measurements affected by gamma rays from non-density sources. Smith also focuses on determining the thickness of the casing around a borehole. Arnold addresses the correction of density measurements but only focuses on the effects from the minerals thorium, uranium and potassium ore. Correction density measurements affected by others minerals such as silicon are not addressed by Arnold. In addition, Arnold's method requires the use of two detectors to measure and correct density measurements. Also, in Arnold, a typical environment would be one of approximately several hundred gamma ray API units of radioactivity. However, techniques in present logging environments typically have several thousand API units of radioactivity.

Therefore, there remains a need for a method to correct density measurements that are affected by gamma rays from sources other than the density tool.

SUMMARY OF THE INVENTION

It is an object of this invention to correct the formation density measurements effected by gamma rays emitted by earth :formation elements that are activated by non-density tool sources.

Another object of this invention is to determine the number of detected gamma rays generated from the activated earth elements.

Another object of this invention is to determine the number of occurring overflows that are the result of normally occurring pile-ups.

Another object of this invention is to determine formation density using a single gamma ray detector.

Density measurements of earth formations can be performed simultaneously with other logging measurements using a logging tool string similar to the Nuclear Porosity Lithology Tool (NPLT). In these tools, an Accelerated Porosity Sonde (APS) neutron tool is on the same tool string and is adjacent and above the density tool. As stated earlier, whenever another neutron tool, especially one having a high energy (14 MeV) source and/or a very high neutron output, is run in combination with a density tool, formation element activation becomes a problem. Silicon and oxygen are two common elements that have significant long-lived activation states (2.2 minute and 7.1 second half-lives, respectively). The emitted gamma rays from the activated silicon and oxygen are scattered in the formation and borehole regions to lower energies which are in the range of those detected by the formation density tool. These gamma rays will thus be detected by the density tool detectors and will, unless compensated for, affect the formation density measurement.

The present invention solves this problem by identifying and removing detected gamma rays that were not generated by the density source. These gamma rays, which will be referred to as "activated gamma rays", are usually generated by another (logging tool) source or result from naturally occurring gamma rays.

In this invention, the formation density is measured by detecting gamma rays occurring in the formation, generating a count of the detected gamma rays, from this count determining the number of "activated gamma rays" detected, removing these activated gamma rays from the detected gamma ray count and determining a corrected formation density log from the detected gamma rays generated by the density source.

The present invention provides a combination of acquisition equipment and improvements to the density processing methods to extend the useful range of applications for gamma density measurements. In this invention, the subsurface is irradiated with low energy gamma rays (approximately 0.66 Mev) from the density tool source. A detector means, in the density tool, detects both the activated gamma rays generated from the formation elements and the gamma rays generated as a result of the density tool source. In addition, gamma rays above a threshold energy level are also separately detected by another detector means on the density tool. These detected gamma rays are known as "overflow" gamma rays. From these overflow gamma rays, the number of activation gamma rays can be determined. A count of the total gamma rays detected by the detector means and a count of the activated gamma rays detected by the detector means are determined. The count of activated gamma rays is subtracted from the total gamma ray count to obtain the count of gamma rays emitted by the density tool source. This corrected gamma ray count is used with density processing algorithms and techniques to compute formation density corrected for formation element activation.

DESCRIPTION OF THE PREFERRED EMBODIMENT

Figure 1:
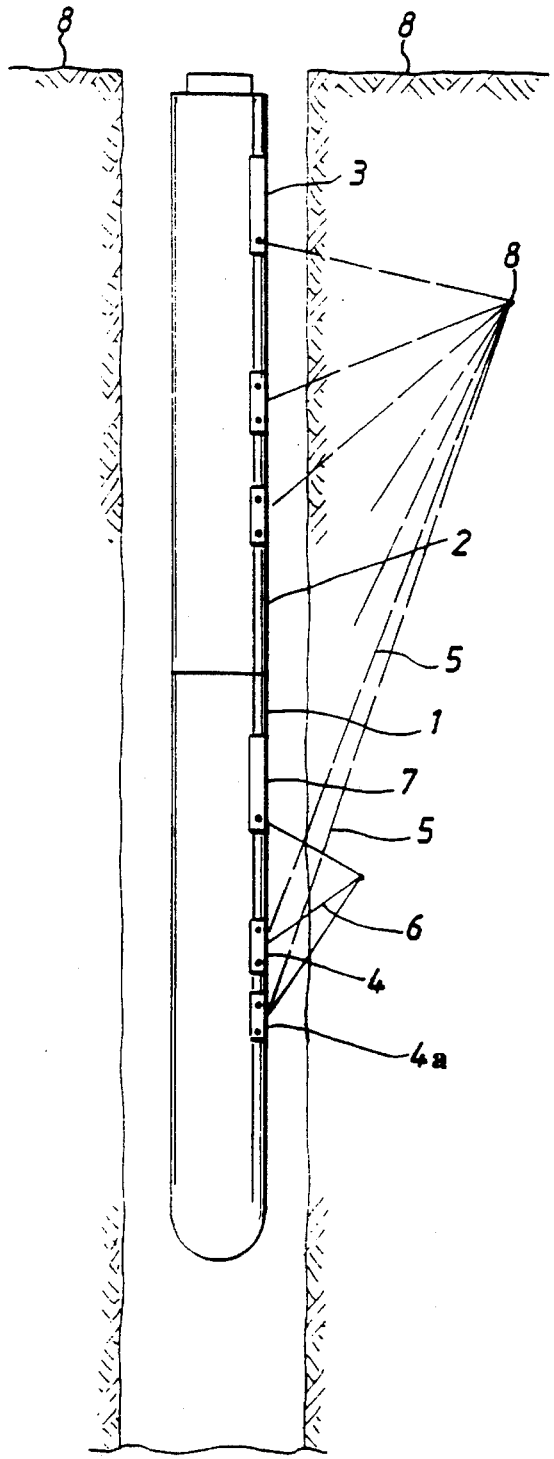
FIG. 1 is a diagram of a well logging tool string having neutron-based a porosity tool and a density tool.

Density measurements of earth formations can be performed using a logging tool similar to the Nuclear Porosity Lithology Tool (NPLT) as shown in FIG. 1. FIG. 1 shows a density tool 1 in a typical configuration in a borehole. As is shown, an APS tool 2 which measures porosity 2 is on the same tool string and is adjacent and above the density tool 1. During logging process, both tools operate simultaneously. The density tool detectors 4a and 4a detect gamma rays 6 generated as a result of the density source 7 irradiating the formation 8 with neutrons. The APS neutron source 3 irradiates the formation 8 and, via neutron-induced activation, generates gamma rays 5 that may also be detected by the density tool detectors 4 and 4a. Because density measurements are determined based on the number of gamma rays that are detected by the density tool, using the total detected gamma ray count will result in inaccurate density measurements.

Figure 2:
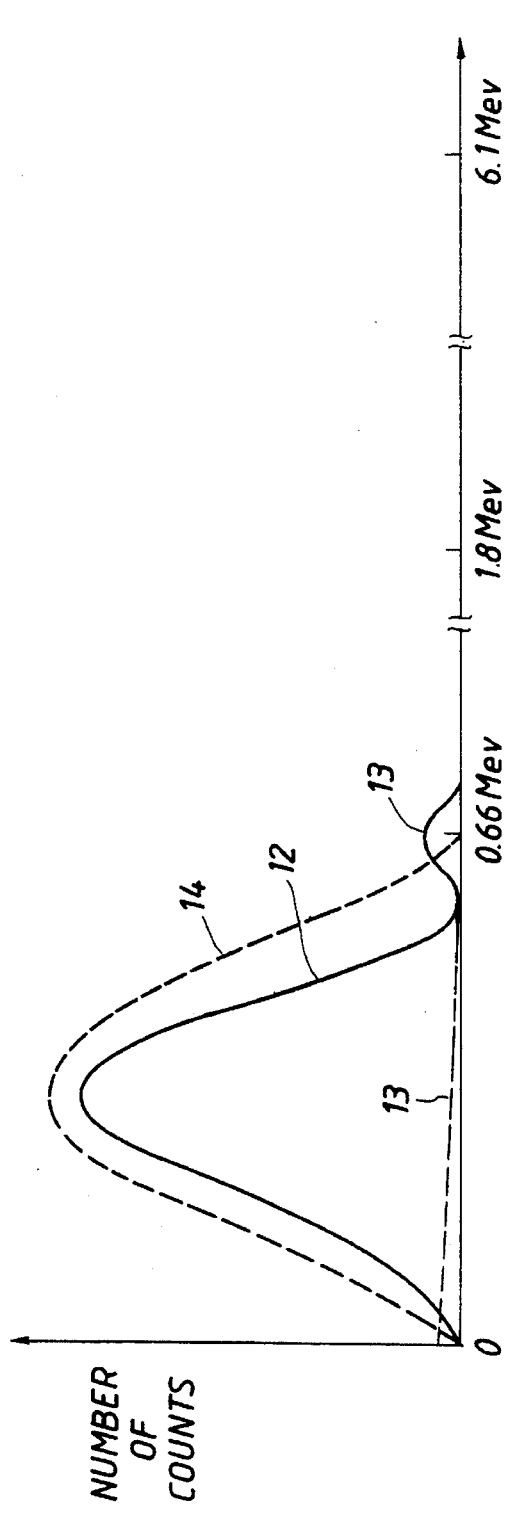
FIG. 2 is a flow diagram of the density measurement procedure including the correction for non-density source gamma rays detected by the density tool.

FIG. 2, shows the total number of gamma rays detected at detector 4. This total gamma ray count consist of the normal density (compton-scattered) events from the density source, gamma radiation from the gain stabilization source and gamma radiation from events caused by naturally occurring radiation or by activated gamma rays caused by other nuclear logging equipment. A typical spectrum of the detected gamma radiation is shown in FIG. 2. The preferred normal density events are identified by the response 12. The gain stabilization response is shown as 13. The response detected at detector 4 is shown as 14 and as mentioned contains the normal density measurement, the gain stabilization response and activation overflow events. This spectrum response is measured for each detector used in this embodiment and at each depth in the well that is logged.

Figure 3:
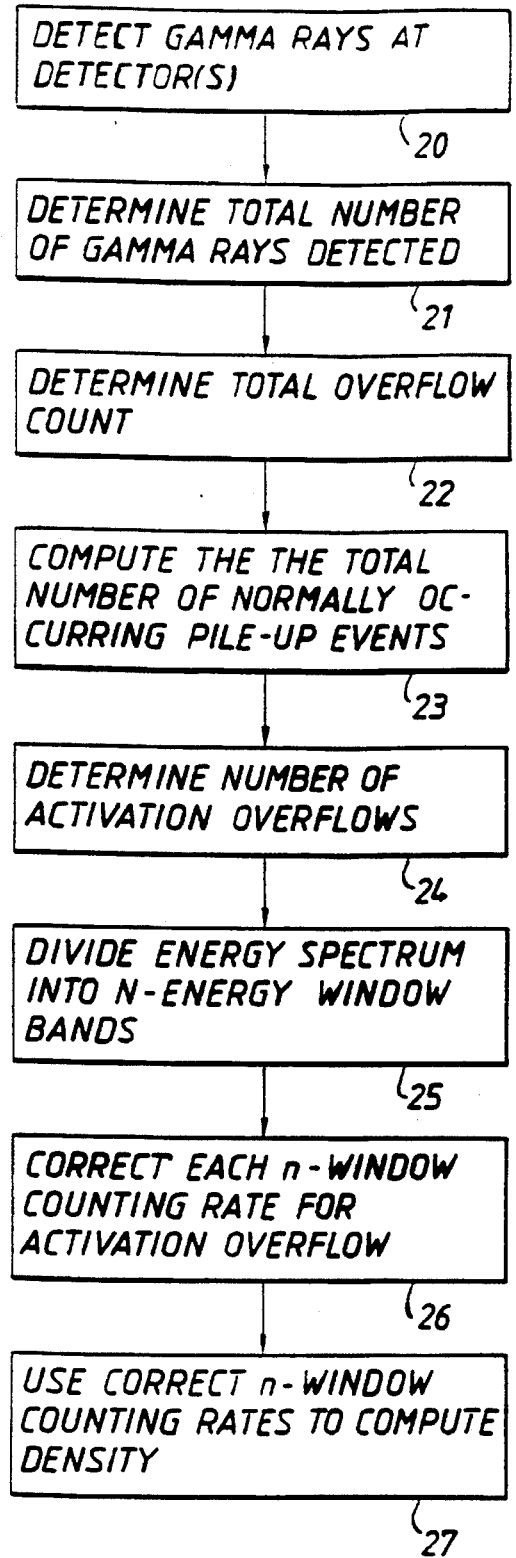
FIG. 3 is a graphical representation of the gamma ray energy intensity to the gamma ray energy level and the various radiation sources that are possible.

The present invention has a technique for removal of elements having activation gamma-rays in the several-Mev range. This method which is illustrated by the flow diagram in FIG. 3 is suitable for removal of fast-neutron-activated elements such as silicon and oxygen, thermal-neutron-activated elements such as aluminum, as well as naturally occurring radioactivity such as thorium, uranium and potassium. For removal, a determination is made of the activated gamma ray contribution to the measured spectrum by measuring "high energy" gamma-rays above approximately 0.75 Mev.

In one embodiment of this method, the formation 8 is irradiated with gamma radiation at approximately 0.66 Mev. The gamma-ray detectors 4 and 4a used in the density tools are typically scintillation detectors composed of a scintillation crystal (e.g. NaI-sodium iodide) coupled to a photomultiplier tube. As shown in FIG. 3 step 20, density detector 4 spaced longitudinally from the density source 7 detects the low energy gamma radiation 6 and also detects other occurring radiation 5 that has energy levels greater than 0.66 Mev. The other detected radiation is shown in FIG. 2. Next, step 21, determines the total number of these gamma rays 12, 13 and 14 that is detected.

In order to correct for the activation, the method, in step 22, determines from the total number of gamma rays, the number of overflow of gamma rays that was detected. To measure the overflow that is seen by the density tool, a special overflow detection channel 39 is designed in each density tool. This channel is designed to detect only gamma-ray events above approximately 0.75 Mev. These detected gamma ray events, detected by this channel subsequently referred to as "overflows", are in two forms: activation overflows, caused by non-density sources or by naturally occurring radioactivity, and pile-up overflows caused by normally occurring pile-up events.

Pile-up events occur when two or more nuclear pulses detected by the density tool occur at virtually the same instant in time. The pulses add (pile-up on each other) and appear as one pulse being larger than any of the constituent pulses. Because they appear as one pulse which has an energy above 0.75 Mev, the overflow channel counts them as an overflow gamma ray. An example of this would be two pulses of 0.66 Mev that pile-up and appear to form an overflow pulse of 1.32 Mev.

From the overflow gamma rays, the number of normally occurring pile-up events is calculated in step 23. Normally occurring pulse pile-ups above 0.75 Mev can be determined (parameterized) by measuring overflows vs the true total count-rate in a low radiation formation when the neutron source 7 is off. When the naturally occurring overflows due to pile-up are plotted vs total count rate (ctot) a simple quadratic relationship is found:

$$Overflows = C_1 * C_{tot} + C_2 * C_{tot}^2$$

where $C_1$ and $C_2$ are quadratic (best fit) constants. Therefore, given the total count-rate ($C_{tot}$) the number of overflows due to pile-up can be computed. This number of pile-up overflows is then subtracted from the total measured overflows to determine the number of activation overflows as indicated in step 24.

Figure 4:
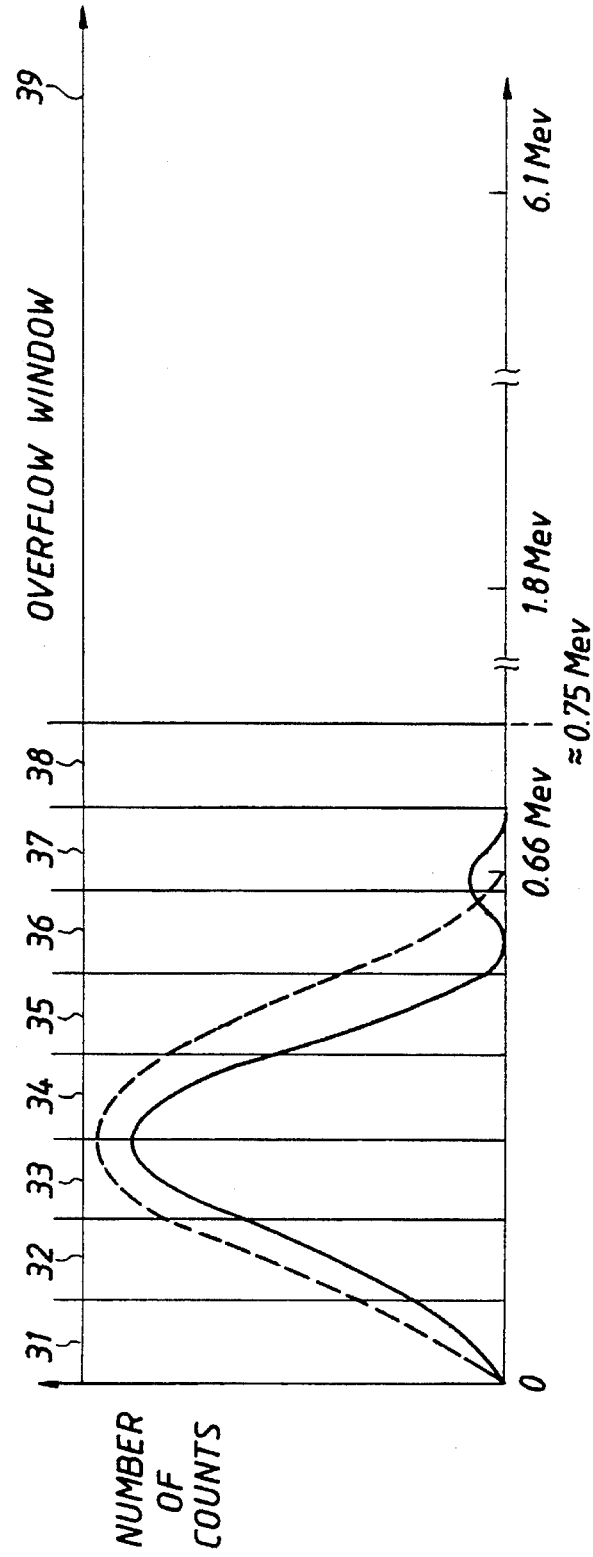
FIG. 4 is a graphical representation of the gamma ray energy windows.

In an application of the present invention, step 25 divides the total density spectrum into several energy windows such as windows 31, 32, 33, 34, 35, 36, 37 and 38 and overflow window 39 as shown in FIG. 4. However, a typical number of windows is five. Each window has its own energy range. The number of gamma rays in each energy window is then determined based on the energy level of each detected gamma ray. A predetermined portion of the measured activation overflows is subtracted from each energy window in step 26.

In practice, it is also not the total gamma ray count-rate which is used in the density algorithms but rather "partial" count-rates in selected energy windows such as energy window one ("E1"), in this description window 31. These partial count-rates are also straightforwardly compensated for activation contamination by subtracting a pre-determined (scaled) amount (F) of the activation overflow count-rate from each energy window. For example, for energy window "E1";

$$CPS''(E1)=CPS'(E1)-\text{Activation overflow}*F(E1)$$

where F is the fraction of the total net activation count-rate falling in energy window (E1), $CPS'(E1)$ is the count rate in window E1 corrected for pile-ups, and $CPS''(E1)$ is the final E1 window count rate corrected for both pile-ups and activation. Each density detector and each energy window will have its own scaling factor $F(Ei)$.

To determine the relationships (the F's) between the amount of the activation count-rate in the overflow window and the corresponding density detection windows, two types of logging passes were made in known lithology formations ("test wells") with the normal density logging source removed:

a) APS (neutron accelerator) off
b) APS (neutron accelerator) on

Several passes were combined to improve the repeatability (statistical precision).

In the "neutrons off" passes, only events from the small gain stabilization source will be seen in the various density detection windows; however, in the "neutrons on" passes, both activation and stabilization source events will be observed. By subtracting the "neutrons off" count-rates from the "neutrons on" count-rates, window by window, we get a measure of how much activation count-rate is present in each window. For the overflow count-rates, the "neutrons off" pass will generate virtually no overflow counts, but for the "neutrons on" pass, they will be essentially 100 percent activation. Hence, with the overflow and the windows net activations count-rates thus measured, the various scale factors F's can be computed straightforwardly as:

$$F[E(i)]=\text{Net Activation count-rate in window } E(i)/\text{overflows}$$

There will be different F's for each energy window and for each detector. As an example, let us say that the ratio between the far detector energy window E1 net activation count-rate and the far detector overflows is 3.0; hence $$F[E(1)]=.0$$

so, if while logging with the APS neutron accelerator on, the far detector net overflow count-rate was approximately 50 cps, then 150 cps (3.0*50) would need to be removed (subtracted) from the measured E(1) window counting rate to correct it for APS-induced activation. This procedure is similar for other density windows in both detectors. Each density detector will have its own Fs. Once each energy window has been corrected for activation, the corrected n-window counting rates are used to compute density in each window in a conventional manner that is used to calculate formation density as shown in step 27.

In another embodiment of the invention, density corrections are accomplished by first taking an independent measurement of activation with the density logging source removed. This measurement can be done experimentally before the actual logging occurs. This measurement is referred to as "accelerator off". In this measurement, a normal density log is taken based on energy from the source of a non-density neutron tool. Also, counts are made of the pulse-heights in the energy region above the normal range of the density and gain stabilization spectrum (approximately 0.75 Mev). As stated earlier, these counting rates in the higher energy channel are called "overflows" (i.e., they overflow the normal range of the ADC which analyzes density and gain stabilization source events). A density measurement is taken during the normal well logging process. This measurement is of the total number of gamma rays detected. At this point, the total number of gamma rays from the density spectrum are known and the total number of overflows is known. In this particular embodiment, no specific number of pile-up events is calculated.

It was discovered that this overflow count-rate is directly proportional to the amount of activation seen by the density detector in the various density detection windows. Thereby, a correspondence (simple ratio, G) between "overflows" and total net (i.e., accelerator-on minus accelerator-off) activation events in the normal density ADC range can be established, and the total count-rate can be compensated as:

$$CPS\_total=CPS'\_total-Overflow*G$$

where CPS_total is the corrected count of density gamma rays, CPS'_total is the total gamma rays detected by the density detector 7 and overflow is the independent measurement.

In practice, it is not the total count-rate which is used but the partial count-rates in selected energy windows such as energy window one ("E1"). These partial count-rates are compensated by additionally measuring the fraction F of the total net activation count-rate falling in each energy window as described earlier. Hence, $$CPS''(E1)=CPS'(E1)-Overflow*G*F(E1)$$

where G is the ratio of the total net activation count-rate falling in energy window (E1). Each density detector will have its own Gs and Fs.

In experiments with the methods of the present invention, APS-induced activation seen by the Litho-Density Sonde (LDS) density tool was measured by special activation detection channels that were designed into each LDS detector system to preferentially detect fast-neutron-induced activation gamma-ray events above approximately 0.75 Mev. The overflow counts were normalized for each density measurement and energy window and then subtracted from each measured spectrum prior to applying a density algorithm. The normalization factors were determined by repeatedly logging sandstone and limestone intervals with the LDS logging source removed and, with the neutron accelerator on as well as off. The normalization factors were then determined from a cross plot of overflows vs activation count-rate observed in the normal density-logging energy range.

Figure 5:
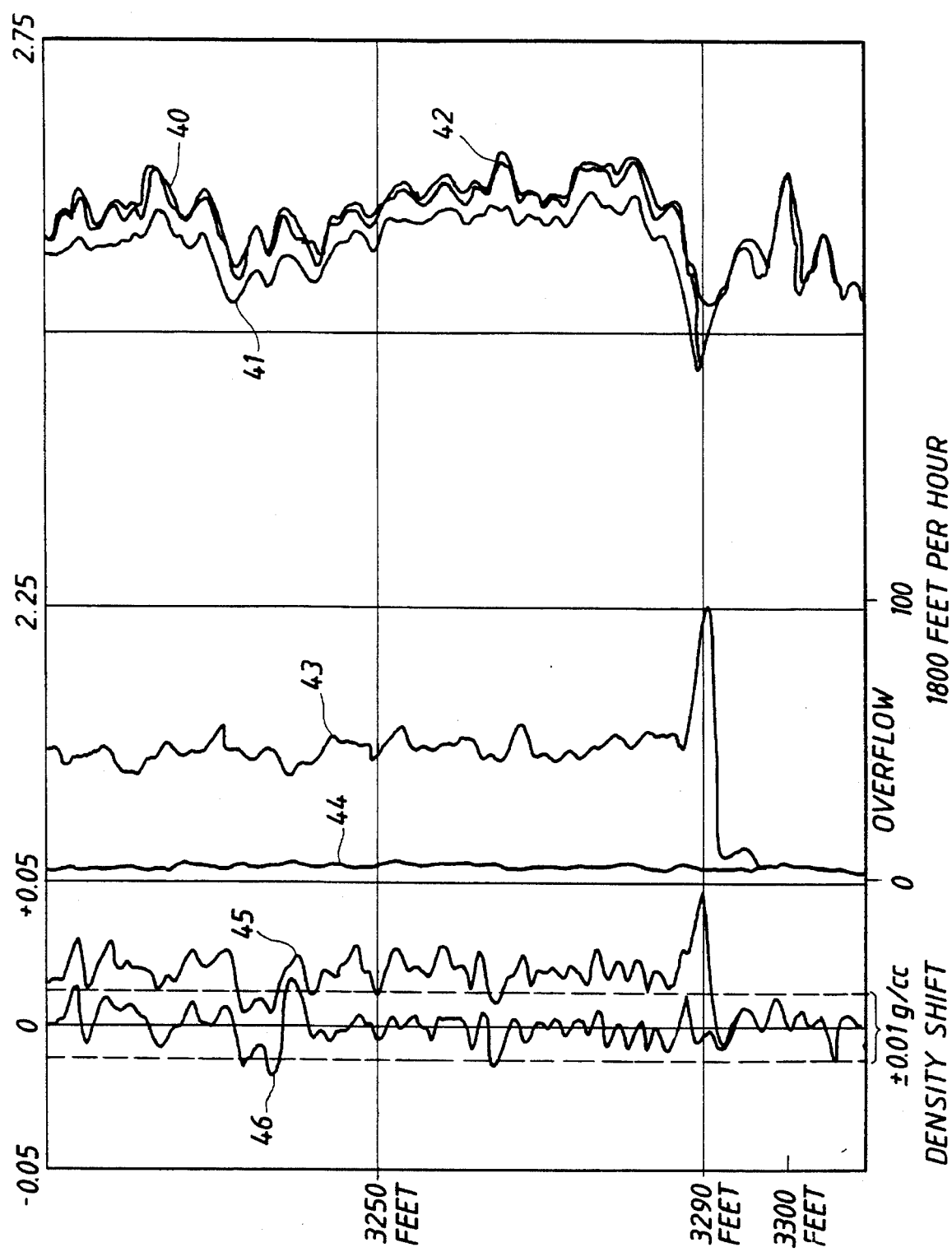
FIG. 5 is a graphical representation of the results of experiments using the density correction method of the present invention.

From the experiments, the observation was that this removal technique works very well. The results of these techniques are indeed demonstrated in FIG. 5, wherein density trace 40 was made with the neutron accelerator off, and density trace 41 was made with the neutron accelerator on. Note the rather large separation between density traces 40 and 41. When the present activation removal technique is applied to pass 41, trace 42 is obtained. Note also that the accelerator was not turned on until reaching the 3290 foot level in the well. The two curves 43 and 44 in the next track left, show overflow count-rates with the accelerator on 43 and the accelerator off 44. Finally, FIG. 5 shows the uncorrected density trace 45 versus activation-corrected trace 46. Clearly, the techniques of the present invention have accurately removed density shifts of up to 5 deci-grags/cc.

Figure 6:
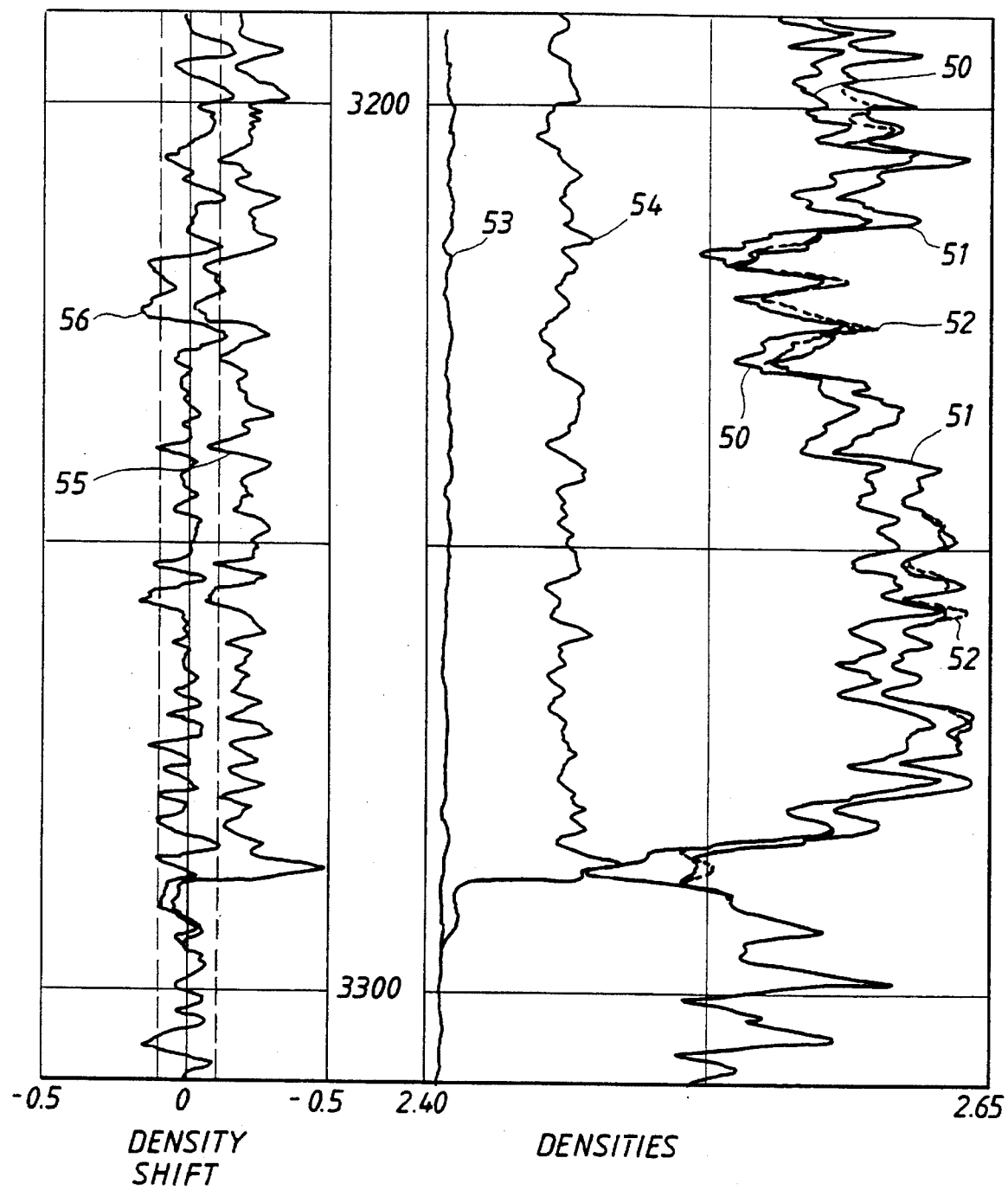
FIG. 6 is a graphical representation of logs with and without gamma ray activation compensation.

FIG. 6 shows a comparison of the neutrons off vs neutrons on logs, with and without activation compensation. In FIG. 6, LDS logs 50, 51 and 52 show measurements with the APS source on and the APS source off: 50 shows an LDS log with the neutron source on; 51 shows the LDS log with the source off; and 52 (dotted line) shows an LDS log with the neutron source on that has been compensated for activation effects. Log 51 shows the ideal density measurement that is not affected by activation. At the speed of 1800 ft/hr over a several-hundred-foot interval, the mean difference between bulk density logs (51 neutrons off minus 50 neutrons on) was approximately 0.016 g/cm$^3$. After application of the techniques in this invention to log 50, log 52 was produced. Notice that the mean difference between log 51 and the compensated APS neutrons on log 52 is reduced to less than 0.0001 g/cm$^3$. As shown, the algorithms removed even these abnormally high activation levels with little or no worsening in the precision of formation density measurement. Referring to the lower portion of FIG. 6, because of the tool lengths, approximately the bottom 20 feet were never activated by the APS source. This is clearly indicated by the overlay of density and overflow traces. The remainder of the passes were made at or near the standard logging speed of 1800 ft/hr. The activation compensation is effective even at these exaggerated levels.

In addition, FIG. 6 shows the difference in the overflows produced when the APS neutron source is off 53 versus on 54.. The overflows in log 53 are from pile-up events and naturally occurring activation. The additional overflows in log 64 are from APS neutron source activation.

FIG. 6 also illustrates the density shifts of the uncompensated log 55 and the compensated log 56. Notice the shift of log 55 from the zero reference point. Also notice that the density shift of the compensated log 56 is almost non-existent.

The same experiment was repeated but at twice the standard logging speed. The increase in the oxygen component increased the mean bulk density difference to 0.029 g/cm$^3$. Compensation reduced this mean difference to a 0.0014 g/cm$^3$ and demonstrated that a single compensation algorithm is effective in removing both silicon and oxygen components.

It should be emphasized that the above cases were deliberately designed to be "worst case" examples and are in fact factors of 5 to 6 larger than those normally encountered in reservoir rocks of interest. For example, at nominal logging speed and neutron output, in a 25 p.u. sandstone reservoir, the uncompensated activation effect on the bulk density measurement would be less than about 0.005 g/cc. This effect would obviously be even less in carbonate rock which contains no silicon. The typical activation effect on measured bulk density is quantified and for a given activation count-rate, is a strong function of bulk density. The statistical precision of bulk density is virtually unaffected by making the activation correction.

Figure 7:
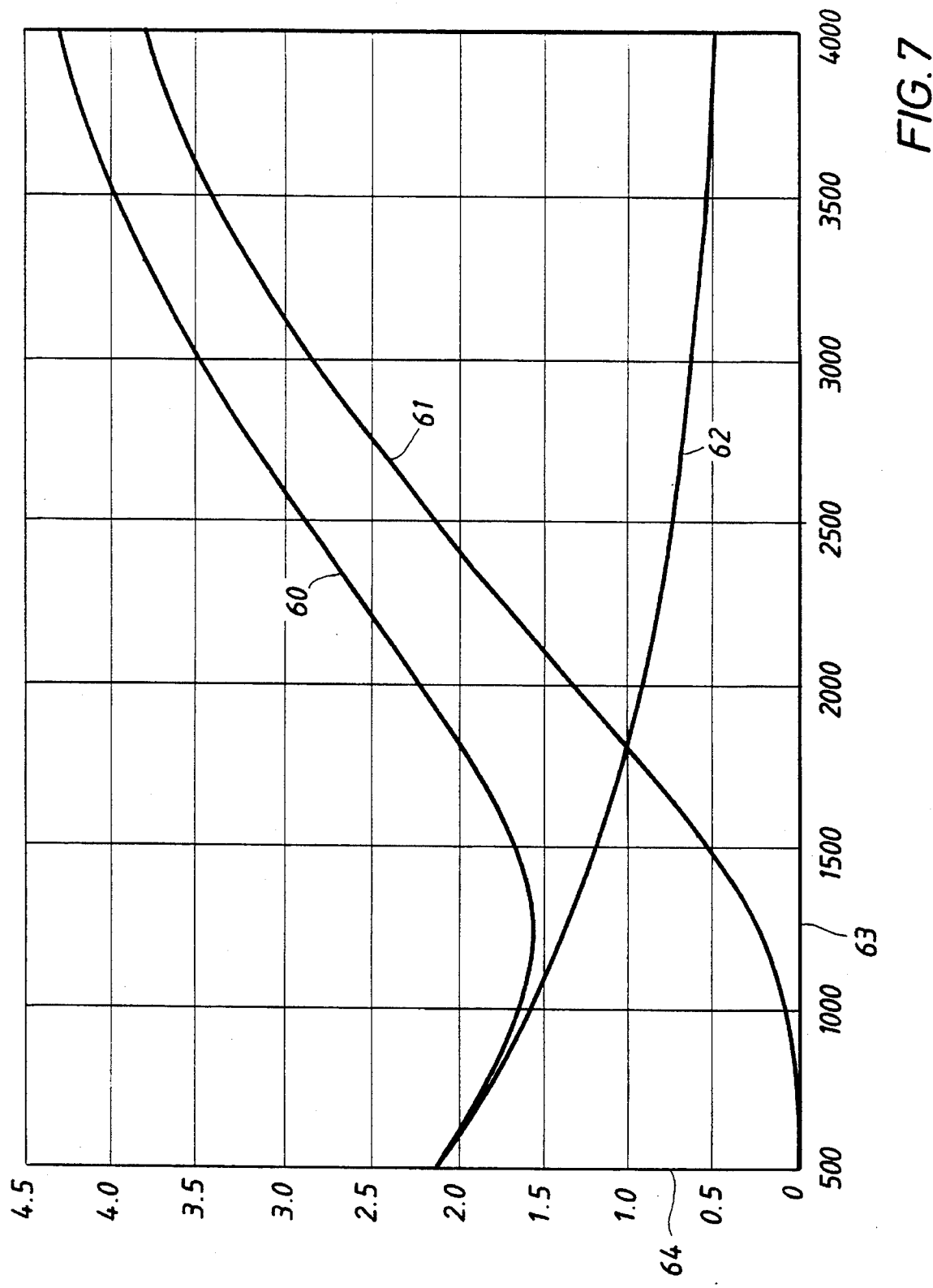
FIG. 7 is a graphical representation of the silicon and oxygen responses as the density tool is moved through the borehole.

As shown in FIG. 7, the mix of silicon and oxygen components seen be the LDS tool is strongly related to the logging speed. In this FIG. 7, the total detected response is identified as 60, the oxygen response is identified as 61 and the silicon response is identified as 62. The logging speed 63 is feet per hour. The relative silicon and oxygen activation is 64. In this illustration a twenty-foot spacing between the neutron source and the density detectors has been assumed as well as an equal mix of silicon and oxygen activities at a reference logging speed of 1800 feet per hour. Clearly at slower speeds, approximately less than 1200 feet per hour, total activation is almost a 100 percent pure silicon measurement, whereas at higher logging speeds, the opposite occurs with oxygen dominating. Therefore, by reducing the logging speed, the measured activation count-rate (overflows) can be made virtually 100% due to silicon. At slower logging speeds, the activation signal can be useful for lithology identification in heavy mud environments where PEF has difficulty or, for example in pin-pointing silicon-based contaminants in otherwise homogeneous carbonate formations.

Naturally occurring radioactivity, due to thorium, uranium, and potassium, is also in the same energy range as is activated silicon and oxygen. As an additional benefit, the present invention is also appropriate for removing the effects of naturally occurring radioactivity, irrespective of the APS accelerator being on or off. Thus, the compensation technique will now permit accurate formation density measurements even in zones previously considered to have been "excessively high" in natural radioactivity. This is not possible with prior density logging services.

There is also a removal technique for barium, an element commonly occurring in heavy drilling muds. When activated via fast reactions, barium emits a gamma ray of approximately 0.66 Mev. This energy is the same gamma ray energy emitted by the several microcurie gain-stabilization "check source" which is attached to the scintillator of each density detector. Since the barium component of 0.662 Mev gamma-rays is distributed rather than being collimated (as is the logging source), the barium contribution should more nearly match the check source spectrum than the logging (scattered) spectrum.

Normally, the check source background is measured at the wellsite or laboratory, and this (constant) count-rate is subtracted from the measured density count-rates at every depth in the well. Clearly, the presence of activated barium while logging will increase the "check source background" level over and above the surface reading. Thus, if not accounted for, not enough background will be subtracted, resulting in higher than true "density" count-rates and hence lower than true density readings.

Since, cesium 137 which has an energy of approximately 0.662 Mev is used as the detector gain stabilization source, the ADC measures in fine detail the region around and including the 0.662 Mev photopeak. Thus, to remove the effects of activated barium, the amount of check source background to be subtracted should be modulated depth-by-depth by the amount of cesium photopeak signal actually measured instead of just using a constant value determined at the surface. For example, if the nominal surface cesium photopeak count-rate were approximately 1000 cps but were at some depth in the well of approximately 1020 cps with activated barium present, then the barium removal algorithm should subtract an additional 0.02 times the normal surface amount in the various density counting windows. It has not been found necessary to correct for barium in actual well logs.

The method of this invention provides significant advantages over the current art. The invention has been described in connection with its preferred embodiments. However, it is not limited thereto. Changes, variations and modifications to the basic design may be made without departing from the inventive concepts in this invention. In addition, these changes, variations and modifications would be obvious to those skilled in the art having the benefit of the foregoing teachings. All such changes, variations and modifications are intended to be within the scope of the invention which is limited only be the following claims.

We claim:

1. A method for determining formation density by correcting density logging measurements that are affected by gamma radiation that is generated by sources other than a density tool source comprising the steps of:

a) irradiating a borehole and earth formation with low energy gamma radiation from the density tool source, whereby the gamma radiation interacts with the materials in the borehole and the formation to produce populations of gamma rays;

b) simultaneously detecting the populations resulting from density tool source gamma rays and non-density tool source gamma rays by a detector in the borehole, said detector being spaced longitudinally apart from the density tool source;

c) generating a count signal indicative of the total number of detected gamma rays;

d) counting all detected gamma rays above a defined threshold energy level, said detected and counted gamma rays over said threshold energy level being overflow gamma rays;

e) determining from the number of overflow gamma rays detected, the number of overflow gamma rays that are pile-up gamma rays;

f) correcting the count signal for gamma radiation emitted by sources other than the density tool source by subtracting from the total detected population of gamma rays, the number of overflow gamma rays that are not pile-up gamma rays; and g) determining the formation density from the corrected count signal.

2. A method for determining formation density by correcting density logging measurements that are affected by gamma radiation that is generated by sources other than a density tool source comprising the steps of:

a) irradiating a borehole and earth formation with low energy gamma radiation from the density tool source, whereby the gamma radiation interacts with the materials in the borehole and the formation to produce populations of gamma rays;

b) simultaneously detecting the populations resulting from density tool source gamma rays and non-density tool source gamma rays by a first detector and a second detector in the borehole, said detectors being spaced longitudinally apart from the density tool source;

c) generating a count signal at each detector indicative of the total number of detected gamma rays and wherein each count signal is used independently to determine a density correction factor;

d) correcting the count signals for gamma radiation emitted by sources other than the density tool source; and e) determining the formation density from the corrected count signals.

3. The method of claim 2 wherein the steps are repeated at various depths as the source and detectors are moved inside the borehole.

4. The method of claim 2 wherein a portion of the gamma rays detected at each detector are overflow gamma rays, said overflow gamma rays being all detected gamma rays having energies above a predetermined threshold energy level.

5. The method of claim 2 further comprising the steps of:

determining the number of overflow gamma rays detected by each detector, said overflow gamma rays being all detected gamma rays having energies above a predetermined threshold energy level;

determining from the total number of gamma rays detected at each detector, the number of pile-up events that are detected as overflow gamma-rays; and subtracting from the total detected gamma ray count, the overflows that are not pile-up gamma rays to get a count of gamma rays from the density tool radiation.

6. The method of claim 2 wherein the gamma ray populations are detected at additional detectors spaced longitudinally apart from the density tool source, wherein count signals of detected gamma rays are generated at each detector and are independently used to produce a correction factor for the density tool measurement.

7. A method for determining formation density by correcting density logging measurements that are affected by activated gamma radiation comprising the steps of:

a) irradiating a borehole and earth formation with low energy gamma radiation from a density tool radiation source, such that the gamma radiation interacts with materials in the borehole and the earth formation to produce a population of gamma rays;

b) simultaneously detecting the population of density tool source gamma rays and activation gamma rays at a detector location in the borehole;

c) determining activated gamma radiation resulting from logging tool radiation sources other than a density tool;

d) correcting the detected gamma ray population for the activated gamma radiation; and e) determining the formation density from the corrected gamma ray count.

8. The method of claim 7, wherein the gamma ray count in step (d) is corrected by subtracting the determined activation radiation from the total gamma radiation detected by the detector.

9. The method of claim 7, wherein the gamma ray count in step (d) is corrected by distributing the gamma rays detected in step (b) into a plurality of energy levels based on the energy level of each detected gamma ray, determining the number of overflow gamma rays detected, said overflow gamma rays being all detected gamma rays having energies above a defined threshold energy level, and subtracting a fraction of the overflow gamma rays from the count of gamma rays in each energy level.

10. The method of claim 9, wherein the fraction of activation gamma rays is determined by multiplying the ratio of the activation gamma rays in a particular window to the total count of activation gamma rays by the total activation gamma rays.

11. The method of claim 7 wherein the gamma ray populations are detected at a plurality of detectors, said plurality of detectors being spaced longitudinally apart from the density tool source, wherein count signals of detected gamma rays are generated at each detector and are independently used to produce a correction factor for the density tool measurement.

12. A method for well logging to determine the bulk density of an earth formation in the presence of gamma radiation emitted from radioactive formation elements comprising:

a) irradiating the borehole and earth formation with low energy gamma radiation from a radiation source in a density tool;

b) detecting the gamma radiation at a detector location in the borehole spaced longitudinally apart from the radiation source;

c) obtaining from the detected gamma radiation, an energy spectra, the energy spectra containing gamma rays with energy levels emitted from radioactive formation elements isotopes;

d) dividing the spectrum of gamma radiation into a plurality of energy level windows;

e) measuring the count-rate in each energy window;

f) counting all gamma rays above a defined energy level, these gamma rays being overflow gamma rays, determining the gamma ray count attributable to pile-up gamma rays, subtracting the pile-up gamma rays count from the number of overflow gamma rays to give the activation gamma rays attributable to radiation from formation element isotopes and subtracting a fraction of the activation gamma rays from each energy window, the fraction being proportional to the number of activation gamma rays in that energy window, resulting in a corrected spectrum; and g) determining the formation density from the corrected gamma ray spectrum.

13. The method of claim 12 wherein the defined energy level is approximately 0.75 Mev. to 0.78 Mev.

14. A method for determining formation density by correcting density logging measurements that are affected by gamma radiation that is generated by sources other than a density tool source comprising the steps of:

a) irradiating a borehole and earth formation with low energy gamma radiation from the density tool source, whereby the gamma radiation interacts with the materials in the borehole and the formation to produce populations of gamma rays;

b) simultaneously detecting the populations of density tool source gamma rays and non-density tool source gamma rays by a detector in the borehole, said detector being spaced longitudinally apart from the density tool source;

c) simultaneously with step (b), detecting the populations of gamma rays resulting from the activation of barium, said activation gamma rays resulting from activation of barium contained in borehole muds;

d) generating a count signal indicative of the total number of detected gamma rays;

e) correcting the count signal for gamma radiation emitted by sources other than the density tool source; and f) determining the formation density from the corrected count signal.

15. The method of claim 14 wherein said barium activation gamma rays have energy levels which are approximately the same as a check source.

* * * * *